Jan. 9, 1923.
T. REID ET AL.
POWER TRANSMITTING DEVICE.
FILED FEB. 15, 1922.
1,441,528
2 SHEETS-SHEET 1
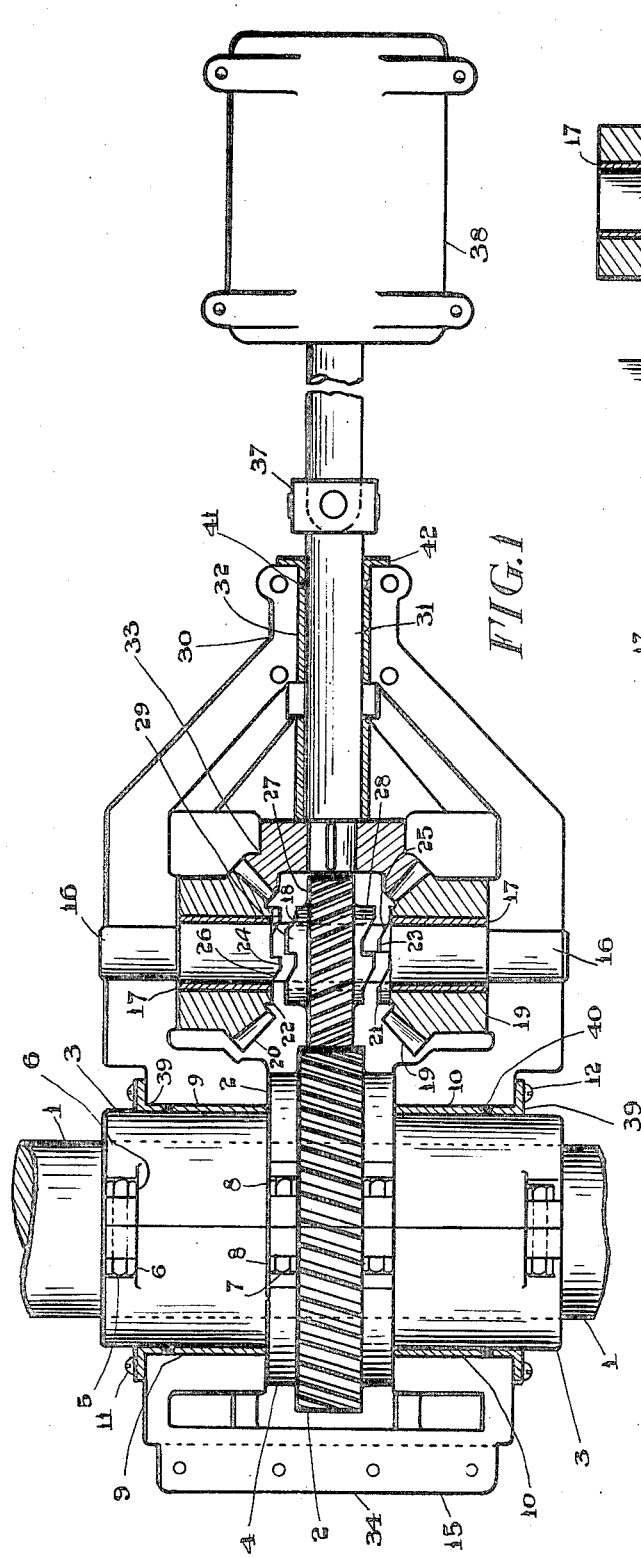
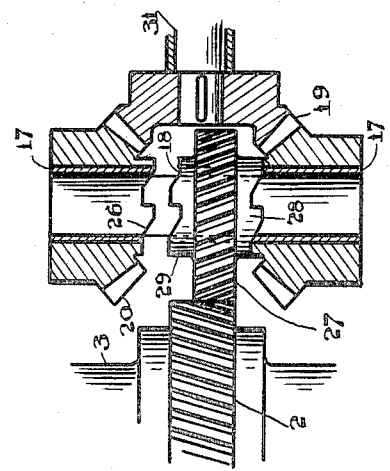
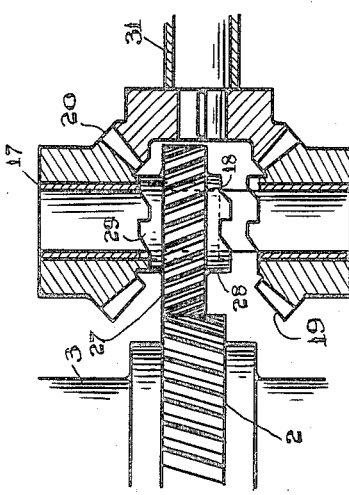
INVENTORS
T. Reid
N. T. Finlayson
BY Fetherstonhaugh
ATTORNEY Jan. 9, 1923. 1,441,528
T. REID ET AL.
POWER TRANSMITTING DEVICE.
FILED FEB. 15, 1922.
2 SHEETS-SHEET 2
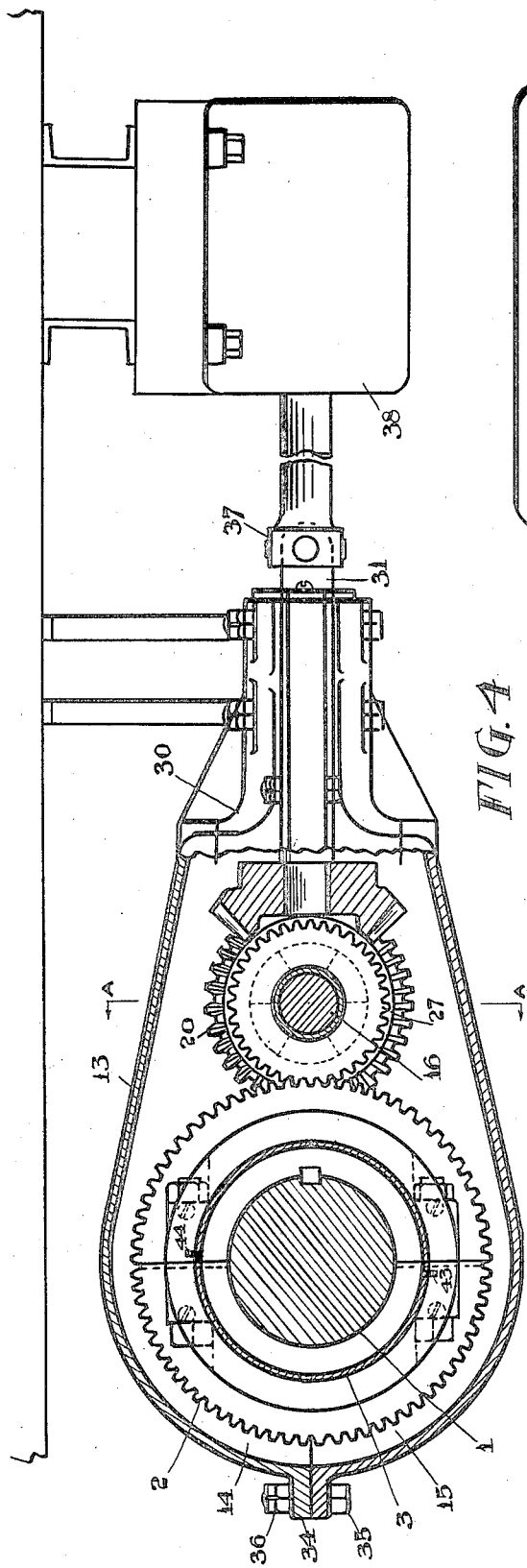
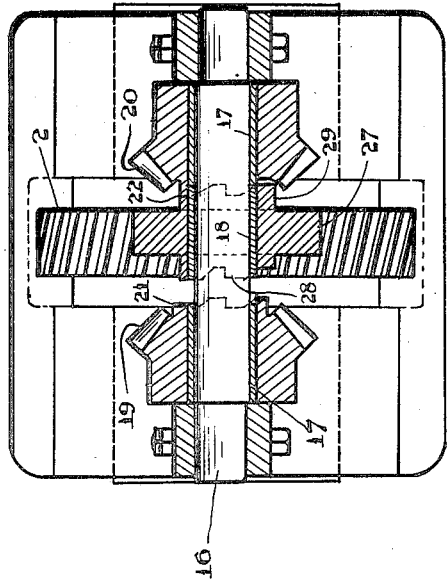
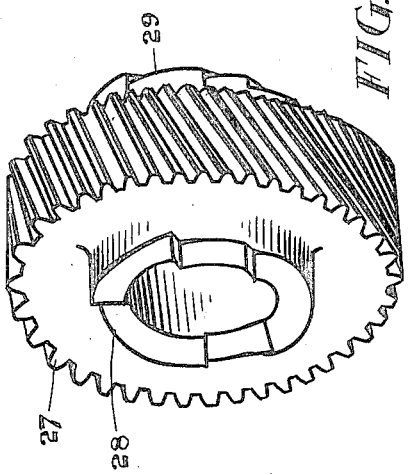
INVENTORS
T. Reid
N. T. Finlayson
BY C. J. Fetherstonhaugh
ATTORNEY Patented Jan. 9, 1923.

1,441,528

UNITED STATES PATENT OFFICE.

THOMAS REID AND NORMAN TERRILL FINLAYSON, OF DUNDAS, ONTARIO, CANADA, ASSIGNORS TO PITT RAILWAY EQUIPMENTS LIMITED, OF MONTREAL, QUEBEC, CANADA.

POWER-TRANSMITTING DEVICE.

Application filed February 15, 1922. Serial No. 536,685.

*To all whom it may concern:*

Be it known that we, THOMAS REID and NORMAN TERRILL FINLAYSON, subjects of the King of Great Britain, and residing at the town of Dundas, in the Providence of Ontario, in the Dominion of Canada, have invented new and useful Power-Transmitting Devices, of which the following is the specification.

The invention relates to a power transmitting device as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to facilitate the operation of machines driven by the rotation of a vehicle axle, so that the reversal of direction in the movement of the vehicle will in no way affect the continuity of the rotation of the shafts of the driven machine in one direction; to eliminate difficulties and troubles incident to pole changing devices in electric lighting equipments in steam railways; to insure smooth running conditions and avoid interruptions in the drive while the vehicle is in motion; to minimize the wear in the gear members; and generally to provide an automatically reversible transmitting device of a durable nature and economical in construction and maintenance.

In the drawings, Figure 1 is a plan view of the transmission parts and the connections to a machine, showing the permanently meshed driven gears in section and the shiftable pinion in neutral position.

Figure 2 is a sectional view of the driven gears, showing the shiftable pinion in clutch for driving the machine in one direction.

Figure 3 is a sectional view of the driven gears, showing the shiftable pinion in clutch for driving the machine in the same direction, but with reversal of direction of rotation of the axle.

Figure 4 is a longitudinal sectional view of the casing, showing the axle, dead shaft and transmission gear in cross section and the remaining parts in elevation.

Figure 5 is a perspective detail of the shiftable pinion.

Figure 6 is a cross sectional view on the line A—A in Figure 4.

Like numerals of reference indicate corresponding parts in the various figures.

Referring to the drawings, the axle 1 represents a part of the running gear of a vehicle and on this axle the helical gear wheel is mounted.

The gear wheel 2 is made in halves and is formed with the extended hub 3 from the short central hub 4, the latter being of greater diameter and reinforcing the gear. The halves of the extended hub 3 are fastened on the axle 1 by the studs 5 held by the nuts 6 and are further secured through the short hub 4 by the studs 7 and held by the nuts 8.

The bushings 9 and 10 in halves are secured by the screws 43 and 44 to the gear casing 13 and particularly to the upper and lower halves 14 and 15 respectively of said gear casing 13.

Outer ends of the bushings 9 and 10 are packed by the glands 39 held by the screws 11 and 12 and closing in on the packing 40, thereby retaining the lubricant, which flows from the casing where it is originally placed.

The gear casing 13 is formed to support the dead shaft 16, which is encircled by the bushings 17 on which are mounted respectively the bevel gears 19 and 20, said gears having attached thereto clutch members 21 and 22 formed with teeth 23 and 24, said teeth having the bevelled backs 25 and 26 respectively.

The shiftable pinion 27 is mounted on the bushing 18 which turns on the shaft 16 between the bevel gears 19 and 20 and is in helical gear formation and coacts with the gear wheel 2 and slides along the shaft 16 from one bevel gear to the other.

The clutch member 28 extends from one side of the shiftable pinion 27 and the clutch member 29 extends from the other side of said pinion, the teeth of the clutch member 28 and 29 being of similar shape to the teeth 23 and 24, that is to say, having the bevelled backs, and engaging the clutch members 21 and 22 respectively through the teeth 29 which are reversed in direction in relation to the teeth 28, as also in the clutch members 21 and 22 on the gears 19 and 20.

The casing 13 converges at the front end to the bearing 30 for the transmission shaft 31, the latter being encircled by the bushing 32 and the packing 41 closed in by the gland 42. Said shaft 31 carrying at its inner end a bevel gear 33, which is in constant engagement with the bevel gears 19 and 20, so that it may be driven by either one of said gears 19 or 20.

The rear of the casing 13 is flanged at 34 and these flanges are rigidly secured together by bolts 35 and nuts 36.

The transmission shaft 31 extends through the universal joint 37 to the machine 38 which it is intended to drive.

In the operation of this machine the rotation of the axle carries with it the helical gear 2 and as this helical gear turns in one direction, it moves the shiftable pinion 27 in the direction of one or other of the bevel gears 19 or 20, the teeth of the clutch from the shiftable pinion engaging the teeth of the clutch from the bevel gear, whereby the latter is rotated with the shiftable pinion, that still remains in constant coaction with the helical gear 2.

No matter which of the bevel gears is engaged by the shiftable pinion, the drive is continuous and in the one direction, as the constant connection of the bevel gear on the transmission shaft with the opposing bevel gears, insures steady rotation of the said transmission shaft and of course the armature shaft.

In reversing the direction of rotation of the axle of the vehicle, the helical gear 2 moves the shiftable pinion away from its former engagement and moves it over to the opposing bevel gear, thereby keeping the transmission shaft rotating in the same direction.

In the event of a sudden jolt, such as constantly occurs on railway trains at stopping, starting or shunting, the shiftable pinion will be held in a neutral position, because a very light movement backwards or forwards, as the case may be, releases the said pinion from engagement with the bevel gear and the instant it is released it can go no further until there is sufficient movement in one direction or the other to bring it into engagement with one of the gears, consequently the banging that so often occurs will not affect the dynamo drive, which is a great saving on the machine.

The angular teeth of the axle gear and the shiftable pinion while broadly known in many gear mechanisms are essential elements in this invention in the particular assembly and use herein described.

It may be explained that in the sudden stop caused by the application of the emergency brakes of a railway train the bad effect of such a jolt on the electric generator of a railway car lighting system is entirely eliminated here since the transmission shaft connected with the armature shaft continues to revolve, thus causing the shiftable pinion to move along the dead shaft into its neutral position owing to the co-action of the bevelled back of the clutch teeth of the shiftable pinion and bevel gear.

It is pointed out that the action of the back of these clutch teeth when gear 2 is brought to a sudden stop will move the shiftable pinion to its neutral position allowing the machine to come to a stop unrestricted.

It will be seen that the helical gear teeth being set at an angle of 15 degrees will move the clutch pinion and engage it with the bevel gear. In the event of the axle gear being brought to a standstill the motor gear then becomes the driving power and consequently moves the clutch pinion by action of the bevel back of the clutch teeth. This action will take place instantly on account of the high speed of the bevel gear as compared with the speed of the axle gear.

What we claim is:

1. In a power transmitting device, a rotatable axle, a helical gear mounted thereon and turning therewith, a fixed shaft parallel to the axle, opposing bevel gears freely turning on said fixed shaft, a coacting bevel gear in constant engagement with the aforesaid bevel gears, a transmission shaft driven by said coacting bevel gear and a shiftable pinion of helical form and in constant engagement with said axle gear and adapted to engage one or the other of said opposing gears.

2. In a power transmitting device a rotatable axle, a casing non-rotatably supported from said axle, a helical gear wheel fixedly mounted on said axle within said casing, a shaft parallel to said axle and secured across said casing, a shiftable pinion of helical form and slidably mounted on said shaft and coacting with said helical gear, a transmission shaft journalled in said casing and projecting therefrom, a bevel gear mounted on said transmission shaft and coacting bevel gears opposing one another on said parallel shaft and adapted to be brought into clutch respectively with said shiftable pinion.

3. In a power transmitting device, a rotatable axle, a casing formed in halves and carrying a bushing encircling said axle, a helical gear wheel in halves having a short central hub and an extended reduced hub in halves rigidly secured together and turning in said bushing, a shaft parallel to said axle and secured across said casing, a shiftable pinion of helical form and slidably mounted on said shaft and coacting with said helical gear, a transmission shaft journalled in said casing and projecting therefrom, a bevel gear mounted on said transmission shaft and coacting bevel gears opposing one another on said parallel shaft and adapted to be brought into clutch respectively with said shiftable pinion.

4. In a power transmitting device, a rotatable axle, a casing non-rotatably supported from said axle, a helical gear wheel fixedly mounted on said axle within said casing, a shaft parallel to said axle and secured in the casing, a helical pinion shiftable by said helical gear on said shaft, clutch members extending from said pinion and formed of projecting teeth in annular rows and having bevelled backs, a transmission shaft journalled in said casing and projecting therefrom, a bevel gear mounted on said transmission shaft and coacting bevel gears opposing one another on said parallel shaft and adapted to be brought into clutch respectively with said shiftable pinion and formed to coact with said teeth.

5. In a power transmitting device, a rotatable axle, a casing non-rotatably supported from said axle, a helical gear wheel fixedly mounted on said axle within said casing, a shaft parallel to said axle and secured across said casing, a shiftable pinion of helical form and slidably mounted on said shaft and coacting with said helical gear, a transmission shaft journalled in said casing and projecting therefrom, a bevel gear mounted on said transmission shaft and coacting bevel gears loosely mounted on said shaft, clutch members extending from said helical pinion and from said bevel gears and formed of annular rows of projecting teeth, each set having opposing bevelled backs.

6. In a power transmitting device an axle gear and shiftable pinion having opposing angular teeth in coaction, an axle having said gear rigidly mounted thereon, a contiguous shaft having said pinion slidably mounted thereon, transmission gears in constant engagement and operated by said shifting pinion and a transmission shaft and machine operated by said transmission gears.

7. In a power transmitting device, an axle gear and shifting gear having opposing angular teeth in coaction, an electric generator, a transmission shaft to said generator, transmission gears in constant engagement and engaged by said shiftable pinion and maintaining a constant one direction movement of said transmission shaft, notwithstanding the direction of rotation of said axle gear, and a rotating axle having said axle gear fixedly mounted thereon.

8. A power transmitting device comprising a shiftable pinion reciprocating on a shaft and having angular teeth, a driving gear having angular teeth in coaction with the aforesaid teeth, a transmission gear mechanism having opposing gears turning on said pinion shaft, clutch members having teeth with bevelled slip backs adapted to coact from bevel gear to shiftable pinion in moving the latter to neutral position, and a machine having its shaft connected to said transmission gears and adapted to facilitate the movement of said shiftable pinion to its neutral position by continued rotation.

Signed at Hamilton, Canada, this 24 day of January, 1922.

THOMAS REID.
NORMAN TERRILL FINLAYSON.

Witnesses:
W. H. WARDROPE,
W. H. M. WARDROPE.